INVENTORS
Jacob S. Kamborian
Robert B. Dunlap
BY
Albert Gordon ATT'Y

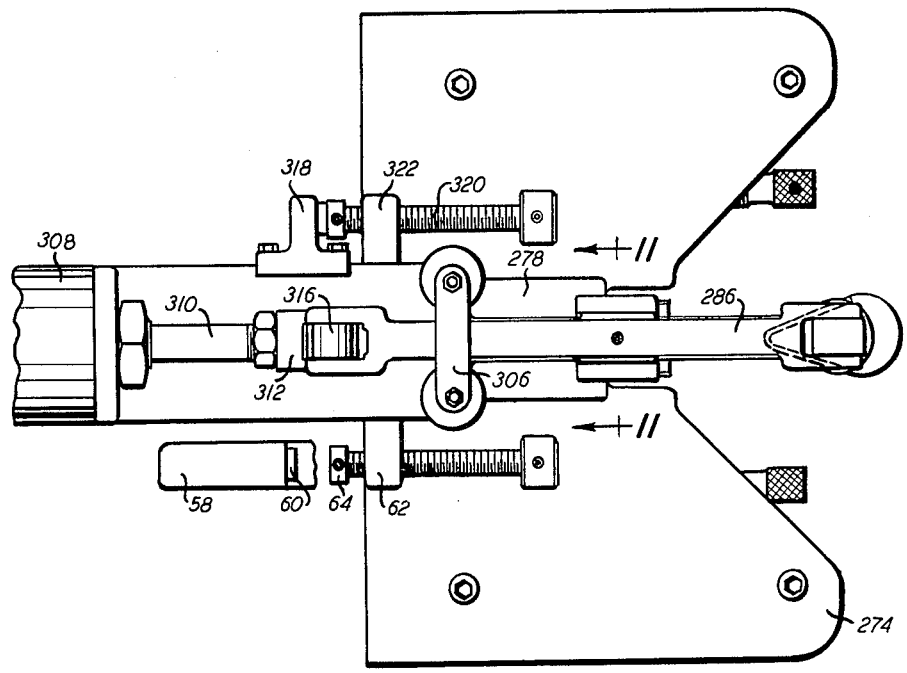
FIG.-9
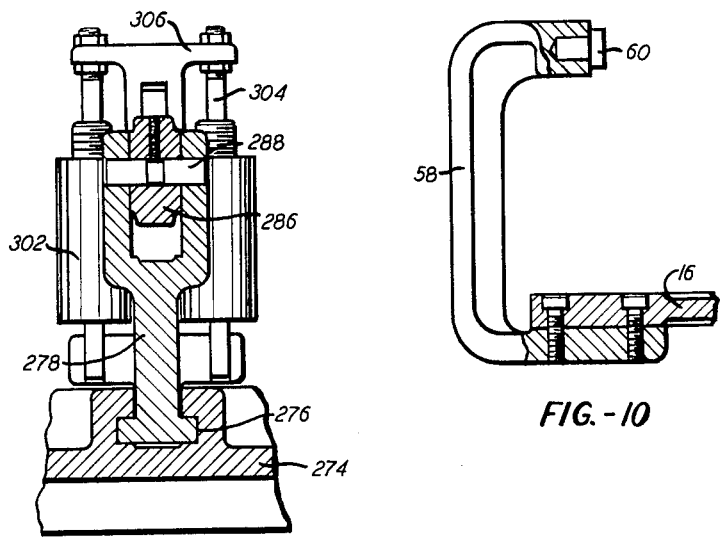
FIG.-11
FIG.-10

United States Patent Office 3,233,261
Patented Feb. 8, 1966

3,233,261
METHOD AND APPARATUS FOR PULLING OVER AND LASTING SHOES
Jacob S. Kamborian, 133 Forest Ave., West Newton, Mass., and Robert B. Dunlap, Medway, Mass.; said Dunlap assignor to said Kamborian
Filed Oct. 19, 1962, Ser. No. 231,756
21 Claims. (Cl. 12—142)

This invention relates to the pulling over and lasting of the toes of shoes and the illustrative embodiment shown has many parts similar to that shown in pending application Serial No. 193,829, filed May 10, 1962.

The invention includes a method that comprises supporting a shoe assembly that includes a last having an upper draped thereon and an insole located on its bottom, pulling the margin of the upper at the toe and forepart portions away from the insole at the toe end and forepart portions of the upper to stretch the upper tightly on the last and create dog ears between the pulled upper portions that extend outwardly of the last, moving the shoe assembly heightwise towards forwardly movable wipers so as to bring the bottom of the insole close to the level of the wiping surface of the wiping means while maintaining the toe and forepart portions of the upper stretched about the last, pressing the dog ears against the wiping means during the heightwise movement to cause the portions of the upper between the toe end and forepart portions to be stretched about the last, wiping the upper margin against the insole, and releasing the portions of the upper margin that had previously been stretched about the last. Preferably, the gripped forepart portions of the upper are moved toward each other to lay the forepart portions of the upper against the insole prior to the wiping operation, and the toe end portion of the upper is gripped and stretched about the last prior to the gripping and stretching of the forepart portions of the upper margin.

The machine for carrying out the invention includes wipers made substantially the same as those disclosed in the aforesaid application Serial No. 193,829, which wipers are mounted for forward movement that includes both translatory movement and inward swinging movement. An upper gripping head located adjacent the wipers is connected to an air actuated motor so that it may be moved heightwise by the motor. The gripping head has a toe rest mounted on it that serves as a shoe support to support bottom-down a shoe assembly that includes a last having an upper draped about its toe and an insole anchored to its bottom. A front pincers adapted to grip and pull the toe end portion of the upper margin and a pair of side pincers adapted to grip and pull the forepart portions of the upper margin are mounted on the gripping head. Between the front pincers and each side pincers the gripping head mounts a retarder adapted to press the dog ears against the bottoms of the wipers. The side pincers are mounted on the gripping head for swinging movement toward each other. Air actuated motors are provided to open and close the jaws of the pincers, to move each of the pincers and retarders heightwise of the gripping head and to swing the side pincers toward and away from each other.

The machine includes an automatic control system similar to that shown in the aforementioned application Serial No. 193,829, filed May 10, 1962. When the shoe assembly is placed on the shoe support with the gripping head in a lower position and the insole below the tops of the wipers, the control first causes the front pincers to grip the upper margin and pull it downwardly and then causes the side pincers to grip the upper margin and pull it downwardly thus stretching the upper margin about the last and creating the dog ears. The control system causes the machine to come to a stop at this point, and the operator may at this time manipulate levers operatively connected to the motors that apply downward pressure to the pincers to selectively and individually increase or decrease the pressure to each of the pincers and thus relocate the top line of the upper on the last if this is found to be desirable.

The control may now be actuated to cause the gripping head to be raised by the gripper head moving motor to a position that places the insole at a predetermined level above the tops of the wipers. To ensure that the gripped head will rise to this level regardless of the thickness of the insole or the heightwise dimension of the last, a stop, which takes the form of a screw adjustably threaded in a fixed bar on which the gripping head is slidably mounted, is positioned to engage a flat on the gripping head and thus terminate the heightwise movement of the gripping head. During the heightwise movement of the gripping head the control causes the retarders to be raised to press the dog ear against the wipers. A flexible shoe conforming yoke positioned above the wipers acts to press the upper against the last during the heightwise movement of the gripping head. The pincers, retarders and yoke act in conjuction to constrain the upper to the shape of the last during the heightwise movement of the gripping head.

After the gripping head has been raised, the control system causes the side pincers to be swung toward each other to lay the upper margin against the insole and causes the wipers to move forwardly to wipe the margin of the upper against the insole. During the forward movement of the wipers, the pincers and retarders are caused to release the upper margin.

In the accompanying drawings:
  FIGURE 1 is a front elevation of the machine;
  FIGURE 2 is a side elevation of the machine;
  FIGURE 3 is a front elevation, to an enlarged scale, of the upper portion of the machine;
  FIGURE 4 is a plan view of the wipers and the wiper driving mechanism;
  FIGURE 5 is a section taken on the line 5—5 of FIGURE 4;
  FIGURE 6 is a section taken on the line 6—6 of FIGURE 4;
  FIGURE 7 is a view of a valve actuating mechanism taken on the line 7—7 of FIGURE 5;
  FIGURE 8 is a view of the valves actuating mechanism taken on the line 8—8 of FIGURE 5;
  FIGURE 9 is a plan view of the top of the front of the machine;
  FIGURE 10 is a detail of the wiper drawing mechanism;
  FIGURE 11 is a section taken on the line 11—11 of FIGURE 9;
  FIGURE 12 is a plan view of the shoe conforming yoke and its mounting;
  FIGURE 13 is a plan view of the upper gripping head;
  FIGURE 14 is a view taken on the line 14—14 of FIGURE 13;
  FIGURE 15 is a view taken on the line 15—15 of FIGURE 13;
  FIGURE 16 is a view taken on the line 16—16 of FIGURE 13;
  FIGURE 17 is a view taken on the line 17—17 of FIGURE 16;
  FIGURE 18 is a view of a valve actuating mechanism for varying the pressure to the front and side pincers;
  FIGURES 19, 20 and 21 are sections of the valves for controlling the pressure to the front and side pincers showing the valves in three different positions;
  FIGURE 22 is a circuit diagram of the machine control;

The machine comprises a frame 10 (FIGURES 1 and 2) that includes inclined struts 12 and an inclined block 14. The machine is inclined approximately 30° from the horizontal so that the operator may more readily have access thereto, but, for the sake of convenience, parts extending in the direction of the struts 12 will be referred to as extending vertically and parts extending in the direction of the block 14 will be referred to as extending horizontally. The operator is intended to stand to the right of the machine as seen in FIG. 2 facing the machine. Parts extending or moving toward the operator (to the right in FIG. 2) will hereafter be referred to as extending or moving forwardly while parts extending or moving away from the operator (to the left in FIG. 2) will hereafter be referred to as extending or moving rearwardly.

Figure 4:
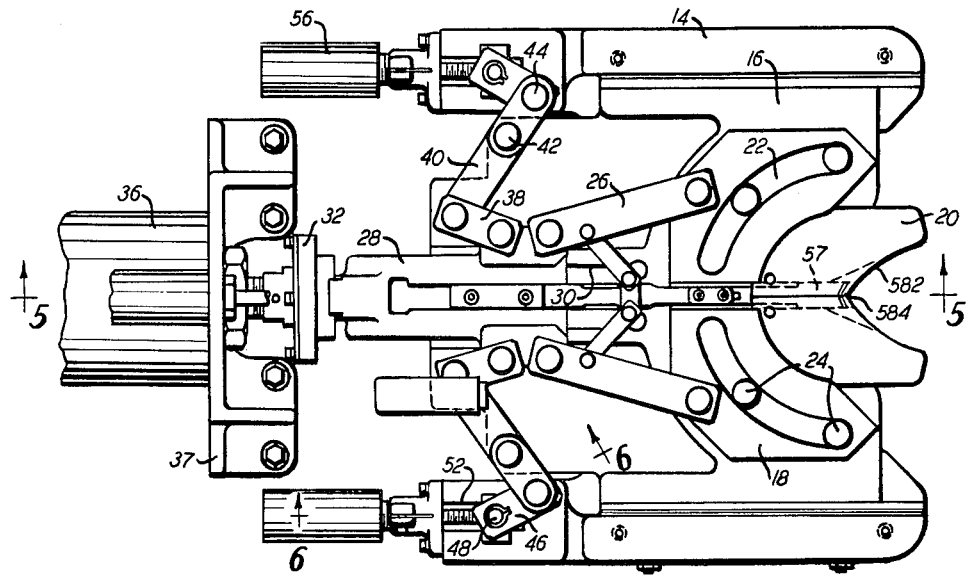
Figure 5:
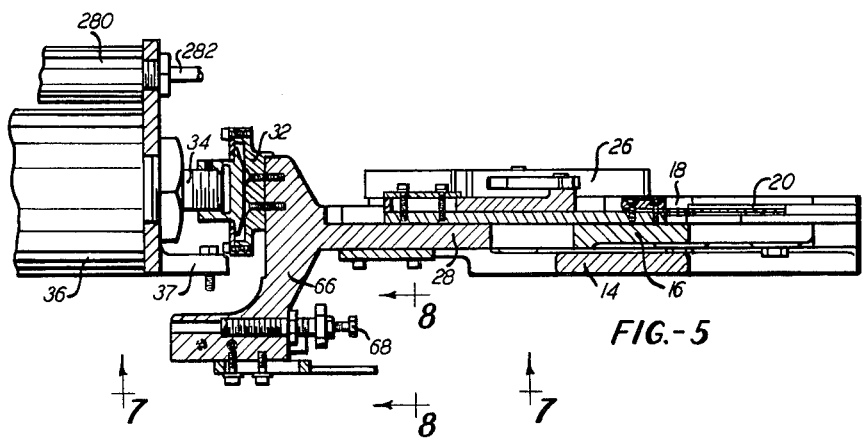
Figure 6:
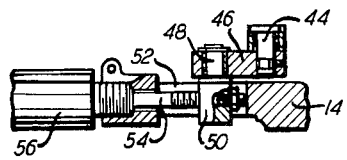

Referring to FIGURES 4–6, a wiper supporting plate 16 is slidably mounted in the block 14 for horizontal movement. The plate 16 supports wiper holding cam plates 18 containing recesses in their forward ends in which are secured wiper blades 20. The cam plates 18 have arcuate cam slots 22 which engage pins 24 fixed to the subjacent plate 16 for controlling the movement of the cam plates and hence movement of the wiper blades to close them about the toe of a shoe. The forward ends of a pair of wiper actuating links 26 are pivotally connected to the cam plates. The rear ends of the links 26 are pivotally connected to a block 28 slidable in a slot 30 in the plate 16. The block 28 is connected by way of a coupling 32, at its rear end, to a piston rod 34 projecting from an air actuated motor 36 mounted on a flange 37 secured to the frame 10. The block 28 has pivotally connected thereto a pair of short links 38 which extend rearwardly and to the rear ends of which are pivotally connected a pair of laterally extending levers 40, which in turn are pivotally connected intermediate their ends to the plate 16 by pivots 42. The outermost ends of the levers 40 are pivotally connected by pivots 44 to links 46, and the rear ends of the links are pivotally connected to pivots 48. Each pivot 48 has a head 50 dependent therefrom that is slidably received in a slot 52 located in the block 14 (FIGURE 6). The piston rod 54 of an air actuated motor 56 mounted on the block 14 is secured to each head 50. If desired, a knife 57 may be slidably supported on the wipers 20 to operate in the manner described in the aforementioned application Serial No. 193,829, filed May 10, 1962.

The plane 16 has a projection 58 extending upwardly of its rear end, see FIGURES 2, 9 and 10. The projection 58 has a button 60 mounted thereon. The frame 10 includes a projection 62 that has a stud 64 threaded therein in alignment with the button 60.

The block 28 has a hanger 66 dependent therefrom. A stud 68, adjustably mounted in the hanger 66, is in alignment with a valve 70 mounted in the frame (see FIGURES 2 and 5). Below the stud 68, the hanger 66 has valve actuators 72, 74 and 76 adjustably mounted therein (FIGURES 7 and 8) which are respectively positioned to intersect valves 80, 82 and 84 mounted on the block 14 during the forward movement of the hanger 66 to be described below.

Figure 3:
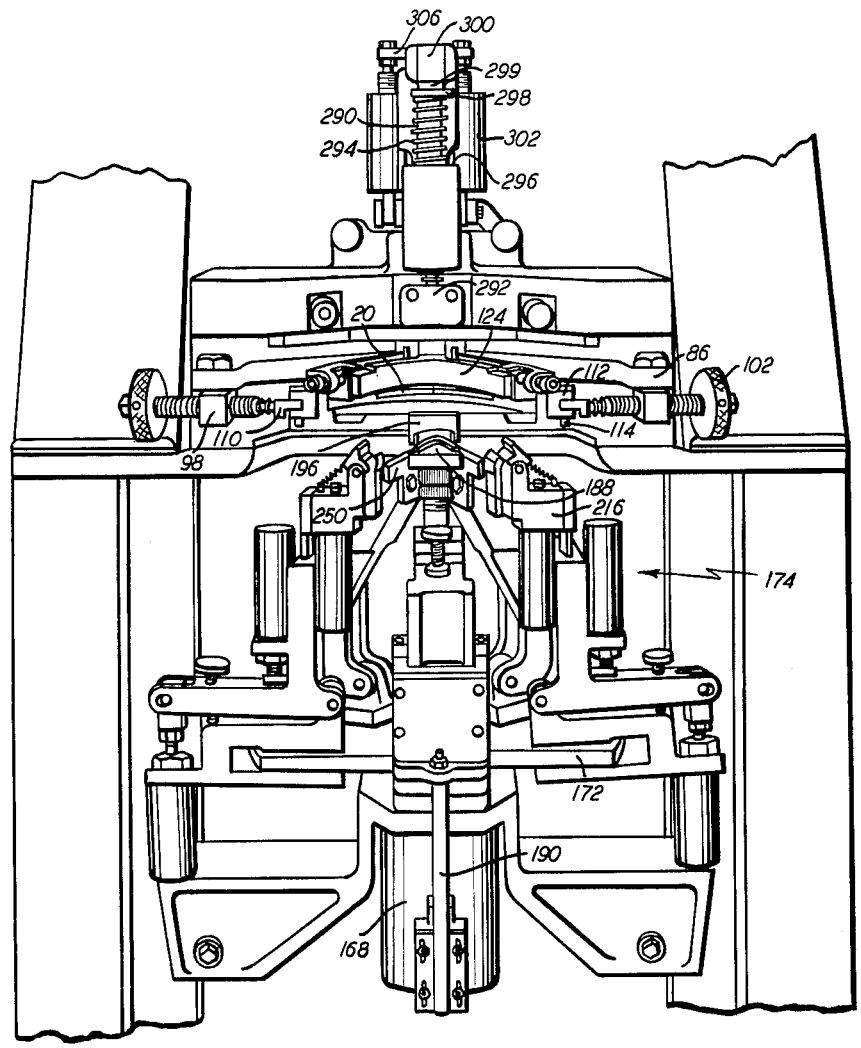
Figure 12:
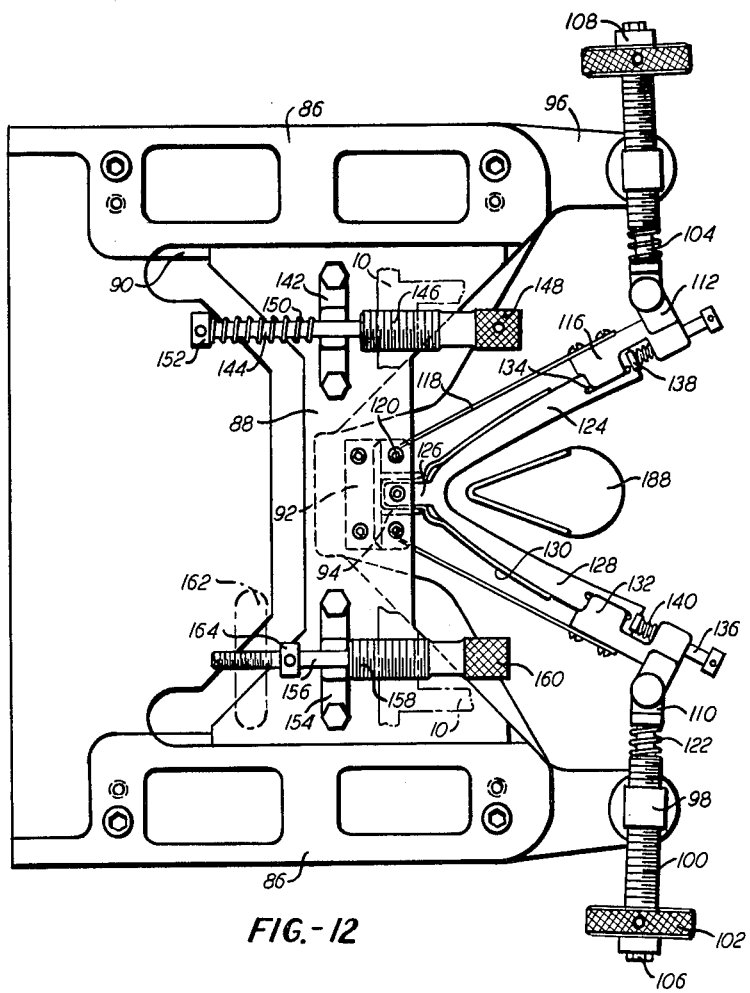

The frame 10 is formed into two spaced brackets 86 located above the wipers 20 and wiper cams 18 (see FIGURE 12). A crossplate 88 extends between the brackets 86 and is slidably mounted for forward and rearward movement in gibs 90 located in the brackets 86. A mounting bracket 92, bolted to the underside of the crossplate 88, has a socket 94 at its forward end. A flange 96 extends forwardly of each bracket 86. An internally threaded sleeve 98 is pivotally connected to each flange 96. A threaded shaft 100 is threaded into each sleeve 98 and a knob 102 is rigidly connected to each shaft 100. Each shaft 100 is hollow and slidably receives a rod 104 extending longitudinally therethrough. Adjusting nuts 106 are threaded to the outer ends of the rods 104 and bear against bearings 108 rotatably mounted on the rods 104. The bearings 108 in turn bear against the knob 102. The inner end of each rod 104 is formed into a head 110 (see FIGURE 3) that extends between the jaws of a clevis 112 and is pivoted to the clevis by a pivot pin 114. Each clevis 112 forms an end of a support arm 116, and each support arm 116 has a spring arm 118 secured thereto and extending rearwardly thereof. The rear ends of the spring arms 118 are each entwined about a pin 120, which pins 120 are mounted on the mounting bracket 92 on opposite sides of the socket 94. A compression spring 122 is mounted on each rod 104 and extends from each shaft 100 to each head 110.

A substantially U-shaped shoe conforming yoke 124 is provided having a bight 126 and a pair of legs 128 extending forwardly of the bight on opposite sides of the bight. The yoke is made of a flexible, deformable material such as Teflon and has a pair of bowed springs 130 extending exteriorly of each yoke leg from the bight forwardly thereof.

The bight of the yoke is received in the socket 94, beneath the wipers 20, and each support arm 116 has a downturned lip 132 that is received in an elongated slot 134 in a yoke leg 128. The slots 134 are made longer than the lips 132. A pin 136 mounted in each support arm 116 has a clip 138 thereon that bears against a yoke leg 128. Each pin 136 is yieldably urged rearwardly by a compression spring 140 to yieldably urge the yoke legs rearwardly and thereby yieldably seat the yoke bight 126 against the socket 94.

The cross-plate 88 has a trough 142 extending upwardly thereof in which a rod 144 is slidably mounted. The rod 144 has a threaded extension 146, that is threaded into the machine frame 10 and a knurled knob 148 at its forward end. A compression spring 150 is coiled about the rod 144 and extends between the trough 142 and an enlarged head 152 at the rear end of the rod 144. A second trough 154 mounted on the cross-plate 88 has a rod 156 slidable thereon. The forward end of the rod 156 is slidably received in a hollow stud 158 that is threaded into the machine frame 10 and has a knurled knob 160 at its forward end. The rear end of the rod 156 is threaded into a hanger 162 depending from the machine frame 10, and a collar 164 is pinned to the rod 156 intermediate the hanger 162 and the trough 154.

Figure 13:
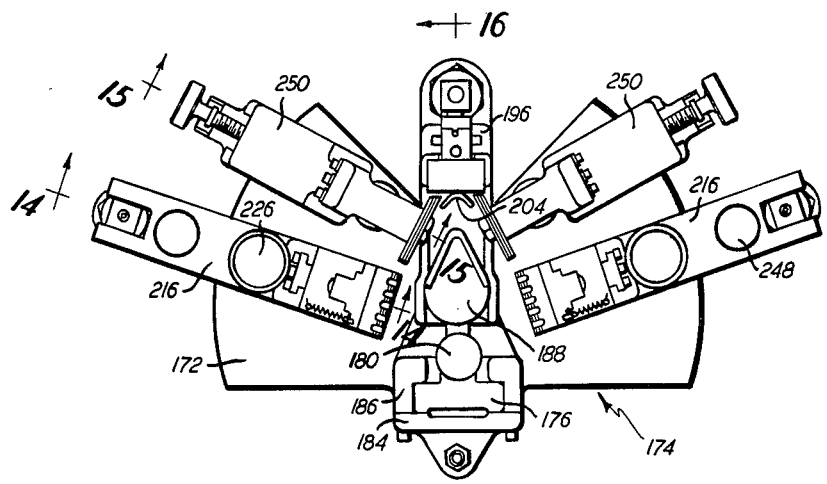
Figure 16:
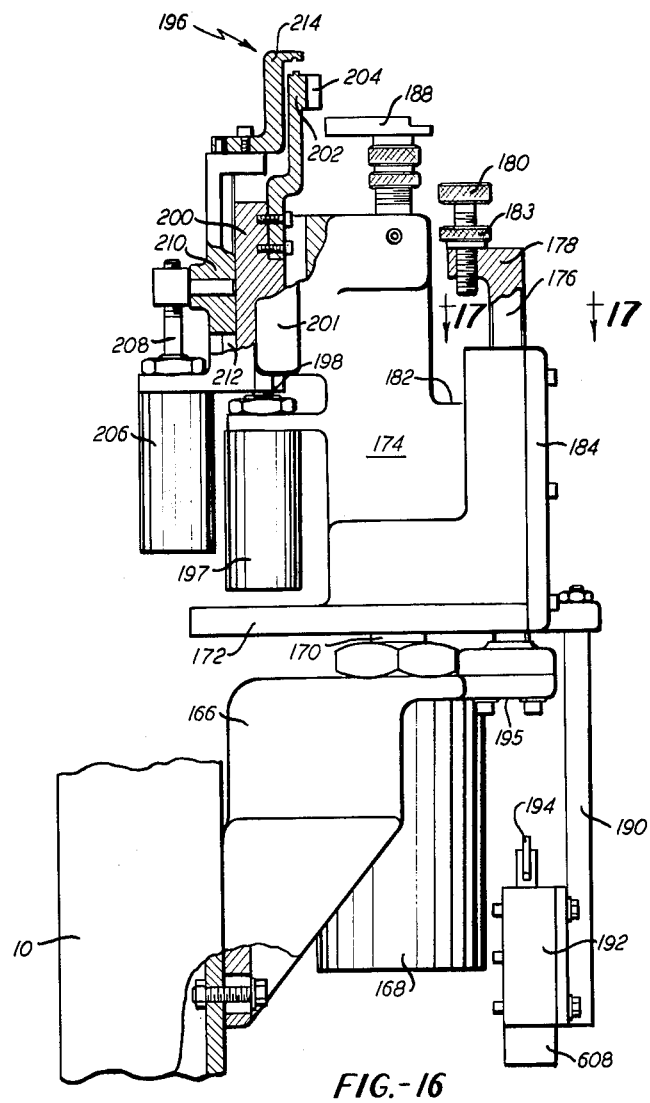
Figure 17:
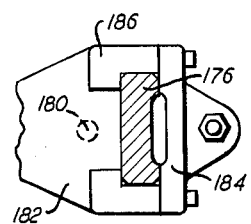

A mounting bracket 166, forming part of the frame 10, extends forwardly thereof below the wipers 20 and the yoke 124 (see FIGURES 2 and 16). An air actuated motor 168 is secured to the bracket 166 and has a piston rod 170 that is secured to the base plate 172 of an upper gripping head 174. A guide bar 176 is secured to and extends upwardly of the bracket 166 through the head 174 (FIGURES 13, 16 and 17). A horizontally extending lip 178, at the upper end of the guide bar 176, has a screw 180 threaded therein that is positioned above a horizontally extending flat 182 on the head 174. A lock nut 183 adjustably positions the screw in the lip. The head 174 includes a cover plate 184 and gibs 186 that extend part way around the bar 176. A toe rest 188 is adjustably secured to the top of the head 174. A hanger 190, depending from the base plate 172, has a valve 192 secured thereto. The valve stem 194 of the valve 192 is in alignment with a flat 195 on the bracket 166.

Referring to FIGURES 13 and 16, a front gripping means taking the form of front pincers 196 is located at the rear of the head 174 on the median line of the machine. The pincers 196 comprises an air actuated motor 197 that is secured to the rear of the head 174. The piston rod 198 of the motor 197 is connected to a front pincers bracket 200, that is slidably guided for vertical movement in gibs 201 on the rear of the head 174. The bracket 200 has a stationary pincers jaw 202 extending upwardly thereof that has a forwardly directed concave gage surface 204. An air actuated motor 206, secured to the bracket 200, has a piston rod 208 that is connected to a bracket 210 which is slidably guided in gibs 212 in the bracket 200. The bracket 210 has a movable pincers jaw 214 secured thereto.

Figure 14:
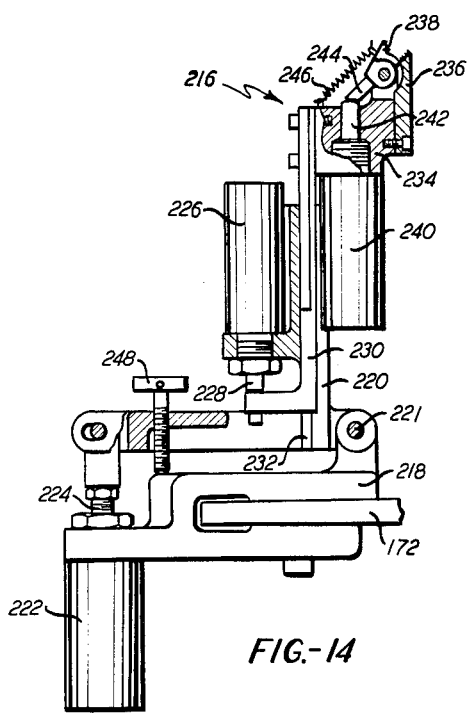

Side gripping means taking the form of side pincers 216 are mounted on the plate 172 forwardly of the pincers 196 and on opposite sides of the toe rest 188. Referring to FIGURE 14, each pincers 216 includes a support 218 anchored to the plate 172. An L-shaped angle 220 is pivoted adjacent its apex by a pivot 221 to each support 218. An air actuated motor 222, secured to each support 218, has a piston rod 224 that is connected to the prone leg of each angle 220. The upright leg of each angle 220 has an air actuated motor 226 secured thereto. The piston rod 228 of each motor 226 is connected to a slide 230 that is slidably guided for heightwise movement in gibs 232 formed in the upright leg of each angle 220. A bracket 234 is secured to the upper part of each slide 230, and a stationary pincers jaw 236 is connected to each bracket 234. A movable pincers jaw 238 is pivoted to each bracket 234. An air actuated motor 240, anchored in each bracket 234, has a piston rod 242 that bears against a stem 244 formed on the movable jaws 238. A tension spring 246, extending between the jaw 238 and the bracket 234, serves to urge the stem 244 against the piston rod 242. A stud 248 is threaded into the prone leg of each angle 220 and is adapted to bear against a support 218.

Figure 15:
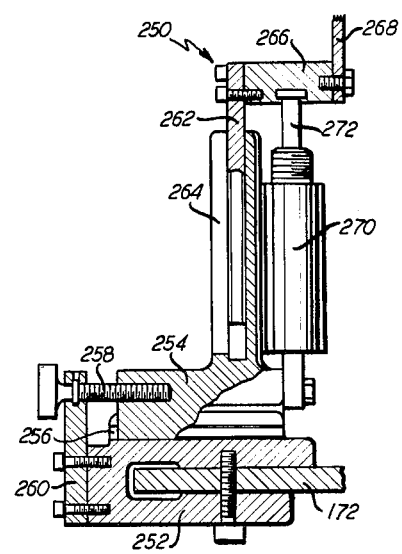

A retarder 250 is mounted on the plate 172, between the front pincers 196 and each side pincers 216. Referring to FIGURE 15, each retarder comprises a support 252 anchored to the plate 172. A block 254 is slidably guided in gibs 256 on the support 252. A stud 258, rotatably mounted in a plate 260 secured to the support 252, is threaded into the block 254 whereby the position of the block in the gibs may be adjusted by rotation of the stud. A slide 262 is slidably mounted for vertical movement in gibs 264 formed on the block 254. A bracket 266 is secured to the top of the slide 262, and a retarder blade 268 is secured to and extends upwardly of the bracket 266. An air operated motor 270 is secured to the block 254. The piston rod 272 of the motor 270 is connected to the bracket 266.

The uppermost portion of the frame 10 is formed into a head 274 (FIGURES 2, 9 and 11). A horizontally extending guideway 276 is provided in the head 274, and a slide 278 is slidably mounted in the guideway 276. An air actuated motor 280, mounted on the flange 37, has a piston rod 282 connected to the slide 278 to thereby effect its movement in the guideway 276. A fulcrum 284 extends upwardly of the slide 278, and a lever 286 is pivotally connected to the fulcrum by a pivot 288 to swing about a horizontal axis. A toe clamp holder 290 (FIGURES 2 and 3) extends through a vertically extending hole in the forward end of the slide 278 and is keyed to the slide to permit vertical movement of the toe clamp holder in the slide 278 without permitting rotation of the holder about its vertical axis. A toe clamp 292 is connected to the holder 290 in a manner that permits swinging movement of the toe clamp about a horizontal axis that is transverse to the longitudinal center line of the machine. A compression spring 294 coiled about the holder 290 and interposed between a shoulder 296 on the slide 278, and a head 298 on the holder 290 acts to yieldably urge the holder 290 upwardly of the slide 278. A button 299 is secured to the top of the holder 290.

The forward end of the lever 286 has a roller 300 rotatably mounted thereon that is adapted to bear against the button 299 and thereby limit the extent of upward movement of the toe clamp 292 under the influence of the spring 294. A pair of air actuated motors 302 are pivoted to the slide 278 rearwardly of the fulcrum 284 and extend upwardly of the slide. Each motor 302 has a piston rod 304 that is secured to a ledge 306 extending outwardly of the lever 286. An air actuated motor 308 is secured to the rear end of the slide 278 and has a piston rod 310 extending forwardly thereof. A wedge shaped cam 312 secured to the piston rod 310 is interposed between a roll 314 rotatably mounted on the slide 278 and a roll 316 rotatably mounted on the rear end of the lever 286. A lug 318 extending outwardly of the slide 278 is in alignment with a stud 320 threaded into a projection 322 located on the frame 10 (see FIGURE 9).

The frame 10 includes a platform 324 (FIGURES 1 and 2) that has a pin 326 extending upwardly thereof. A lug 328 is swivelled on the pin 326 for swinging movement about the axis of the pin and a post 330 is pivoted to the lug 328 by a pivot 332 for swinging movement with respect to the lug about a horizontal axis. The upper end of the post 330 is fitted into a heel clamp holder 334 and a heel clamp 336 is secured to the heel clamp holder 334.

A bracket 338, secured to the strut 12, has a pin 340 secured thereto and extending upwardly thereof that is coaxial with the pin 326 (FIGURE 2). A bracket 342 is pivotally mounted on the pin 340 for swinging movement about the axis of the pin. The bracket 342 has horizontally extending gibs 344 which slidably receive a plate 346. The plate 346 has a nut 348 dependent therefrom into which a screw 350 is threaded, the screw being rotatably mounted in the plate 346. A wheel 352 (FIGURE 1) rotatably mounted in the frame 10 is connected by a universal coupling 354 and bevel gearing 356 (FIGURE 2) to the screw 350. An air actuated motor 358 is pivoted to the plate 346 by a pivot 360. The motor 358 has a block 362 secured thereto by a fastener 364. The piston rod 366 of the motor 358 has a plunger 368 secured thereto, and the plunger is slidable in a hole in the block 362. The forward end of the plunger 368 is pivoted to a link 370 and the link 370 is connected to the post 330.

Figure 1:
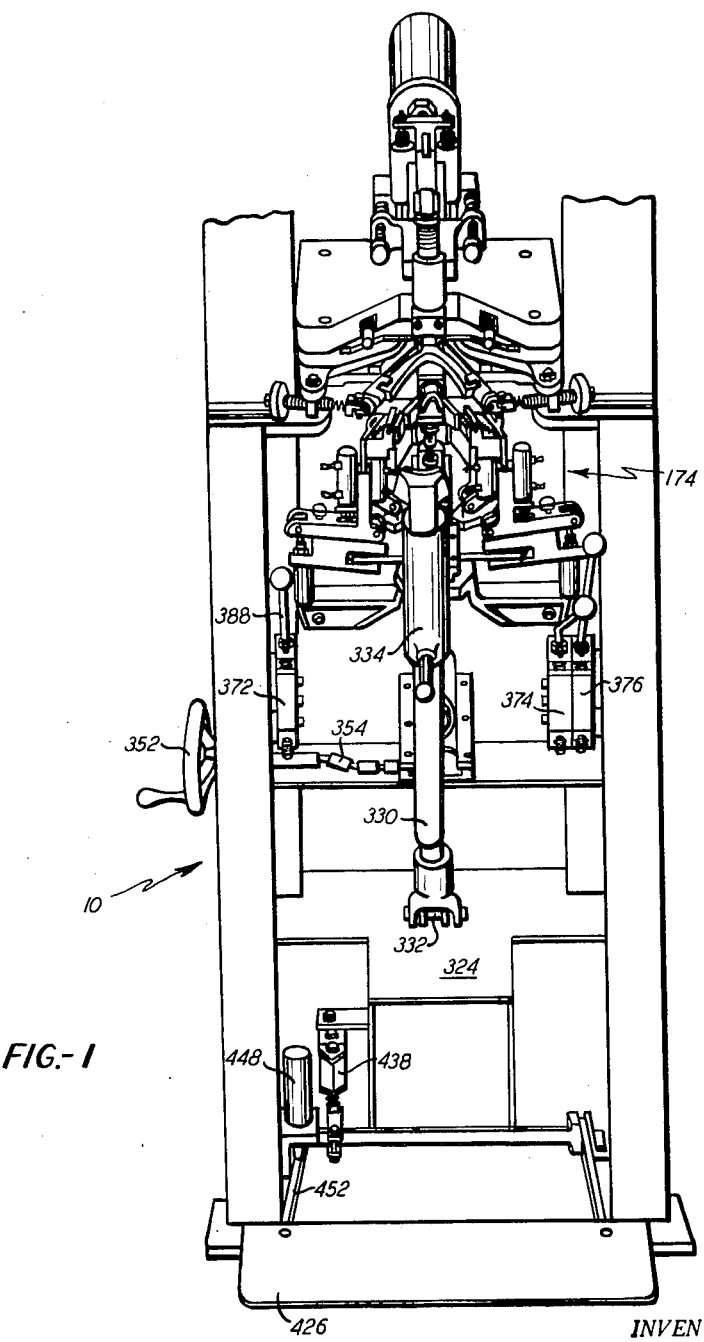
Figure 2:
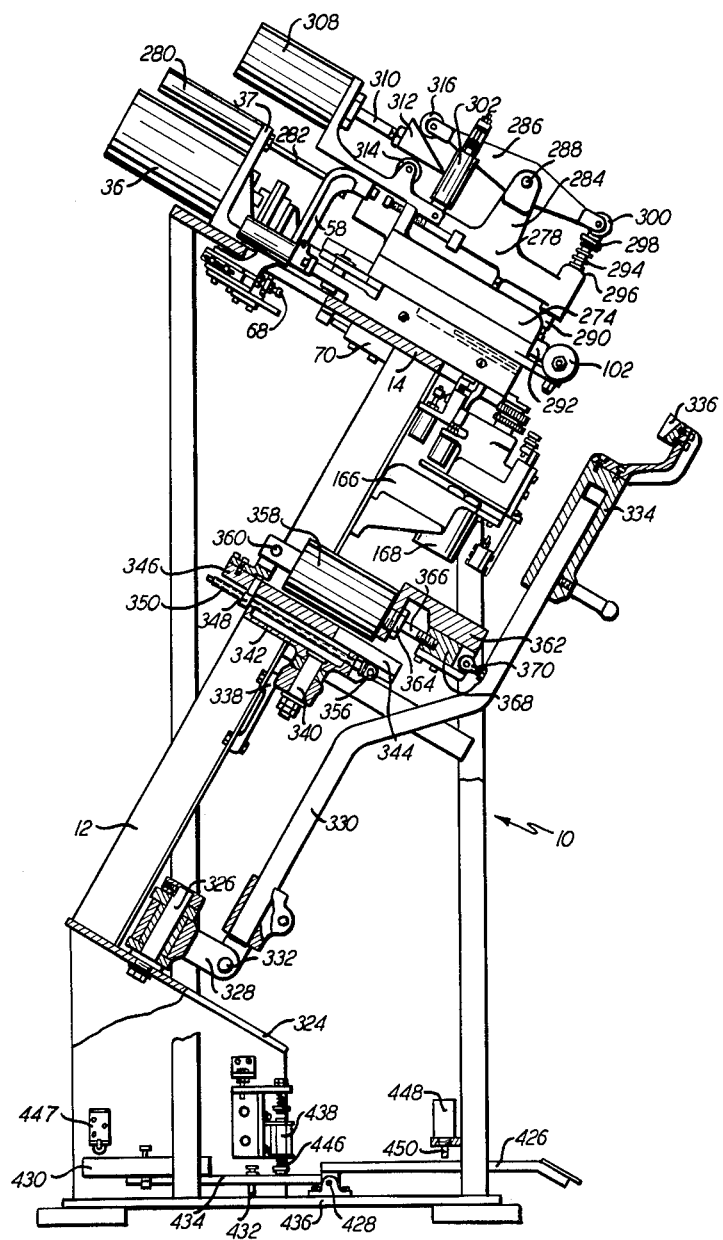
Figure 18:
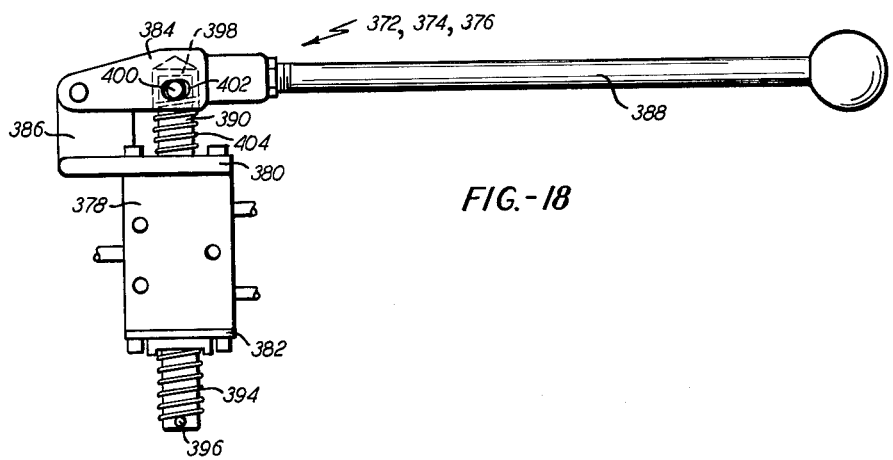

Referring to FIGURE 1, a valve 372 is secured to the frame 10 at one side of the machine and two valves 374 and 376 are secured to the frame 10 at the other side of the machine. The three valves are identical in structure. As shown in FIGURE 18, each of these valves comprises a valve housing 378 having cap plates 380 and 382 secured to its opposite ends. A lever 384 is pivoted to a lug 386 formed in the cap plate 380, and a handle 388 is secured to the lever. A spool 390 is slidably mounted in a bore 392 (FIGURES 19 through 21) in the housing 378 and extends beyond the cap plates 380 and 382. A compression spring 394 is coiled about the spool 390 between the cap plate 382 and a pin 396 projecting out of the lower end of the spool. The upper end of the spool is received in a recess 398 in the lever 384. A pin 400, projecting out of the upper end of the spool within the recess 378, is slidably received in slots 402 formed in the lever 384. A compression spring 404 is coiled about the spool 390 between the cap plate 380 and the pin 400. The valve housing 378 has a port 404 located midway of its length, a port 406 above the port 404 and a port 408 below the port 404 (see FIGURES 19, 20 and 21). Air lines, described more fully below, enter the ports 404, 406 and 408. The valve spool 390 has lands 416, 418 and 420 that have a diameter corresponding to the diameter of the bore 392 so as to be snugly slidable in the bore. An annular chamber 422 is formed between the lands 416 and 418, an annular chamber 423 is formed between the lands 418 and 420, and an annular chamber 424 is formed below the land 420. A conduit 425 connects the chambers 422 and 423.

Figure 19:
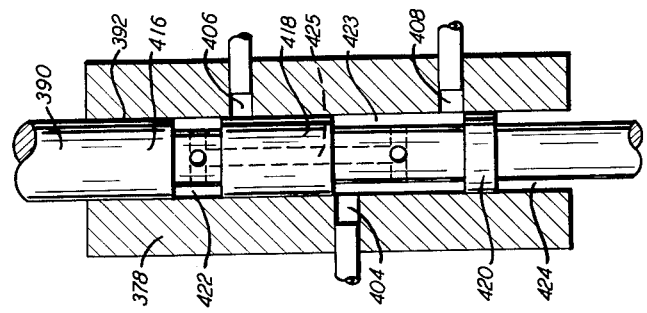

The springs 394 and 404 serve to normally position the valve spool 390 in a median position wherein the port 406 is blocked by the land 418 and the ports 404 and 408 are in communication through the chamber 423 as shown in FIGURE 19. A downward movement of the handle 388 will move the spool 390 downwardly from the FIGURE 19 position to the FIGURE 20 position wherein the land 418 blocks the port 404 and the ports 406 and 408 are in communication by way of the chamber 422, the conduit 425 and the chamber 423. An upward movement of the handle 398 will cause the spool 390 to move upwardly from the FIGURE 19 position to the FIGURE 21 position wherein the port 408 is in communication with the atmosphere through the chamber 424, the port 406 is blocked by the land 418, and fluid entering the port 404 will be trapped by the lands 416, 418 and 420.

An automatically operated pneumatic control system is provided to cause the machine to go through a cycle. The system is actuated by a foot controlled pedal 426 (FIGURES 1 and 2) that is pivoted to the frame 10 by a pivot 428 and is urged counterclockwise (FIGURE 2) about the pivot by a counterweight 430. A stop screw 432, threaded into a pedal extension 434, is engageable with a bar 436 of the frame 10 to limit the amount the pedal may move counterclockwise under the influence of the counterweight. A pilot valve 438 is mounted above the pedal extension 434. The pilot valve 438, which is disclosed in greater detail in the aforementioned application Serial No. 193,829, filed May 10, 1962, has lines 440, 442 and 444 connected to it (see FIGURE 22). The line 440 comes from a source of air under pressure labelled S, the line 442 leads to the working side of the control system, shown solid in FIGURE 22, and the line 444 leads to the venting side of the control system, shown in dashed lines in FIGURE 22. The spool 446 of the valve 438 is yieldably urged against the pedal extension 434, and the valve is so constructed that when the pedal extension and the valve spool are in their lowermost position, the lines 440 and 444 are in communication and the line 442 is vented to atmosphere. An upward movement of the valve spool to its uppermost position by depression of the pedal 426 places the lines 440 and 442 in communication and causes the line 444 to be vented to atmosphere. The positioning of the spool 446 in a median position serves to block both the lines 442 and 444 from the line 440. A valve 447, mounted on the frame 10 above the counterweight 430, has a valve spool that is yieldably urged downwardly. The valve 447 is so positioned that it may be actuated by the depression of the pedal 426 and the raising of the counterweight 430 while the valve 438 is in its upper position. Reference is made to the aforementioned application, Serial No. 193,829, filed May 10, 1962, for a more detailed disclosure of the valves 438 and 446.

A spring return air actuated motor 448 is mounted on the frame 10 above the pedal 426. The piston rod 450 of the motor 448 is located above a bar 452 forming a part of the pedal (FIGURE 1), and the piston rod is normally urged away from bar by the spring in the motor.

The control system includes a plurality of sequence valves such as the valve designated by the reference numbers 420 through 448 in pending application Serial No. 107,156, filed May 2, 1961. The sequence valves are so constructed as to offer resistance to the passage of air therethrough so that the air will follow an alternate path other than through the sequence valve if one is available. When such an alternate path is not available or is blocked, the air will go through the sequence valve.

In the operation of the machine, a last 454 is provided having an insole 456 secured to its bottom and an upper 458 draped over its toe (see FIGURES 23, 23A, 23B and 23C). The upper has preferably been previously heel seat lasted by a heel seat lasting machine such as that disclosed in Patent No. 3,065,808. At this time the wipers 20 are held in their retracted position by the motor 36 so that the valves 80, 82 and 84 are in their normally open position, the slide 278 is held in a retracted position by the motor 280 to maintain the toe clamp 292 in a rearward out-of-the-way position, the spring 294 holds the clamp 292 in an upper position due to the retraction of the piston rod 310 in the motor 308 and the retraction of the piston rods 304 in the motors 302, the gripping head 174 is in a lowered position due to the retraction of the piston rod 170 in the motor 168, the toe pincers 196 is in an elevated position with respect to the head 174, due to the projection of the piston rod 198 out of the motor 197, the jaws 204, 214 of the pincers 196 are open due to the projection of the piston rod 208 out of the motor 206, the side pincers 216 are in an elevated position with respect to the head 174 due to the retraction of the piston rods 228 in the motors 226, the jaws 236, 238 of the pincers 216 are open due to the retraction of the piston rods 242 in the motors 240, the pincers 216 are in an outward position due to the retraction of the piston rods 224 in the motors 222, the retarder blades are in a lowered position with respect to the head 174 due to the retraction of the piston rods 272 in the motors 270, and the heel clamp 336 is swung to a forward position due to the projection of the piston rod 366 from the motor 358.

Figure 22:
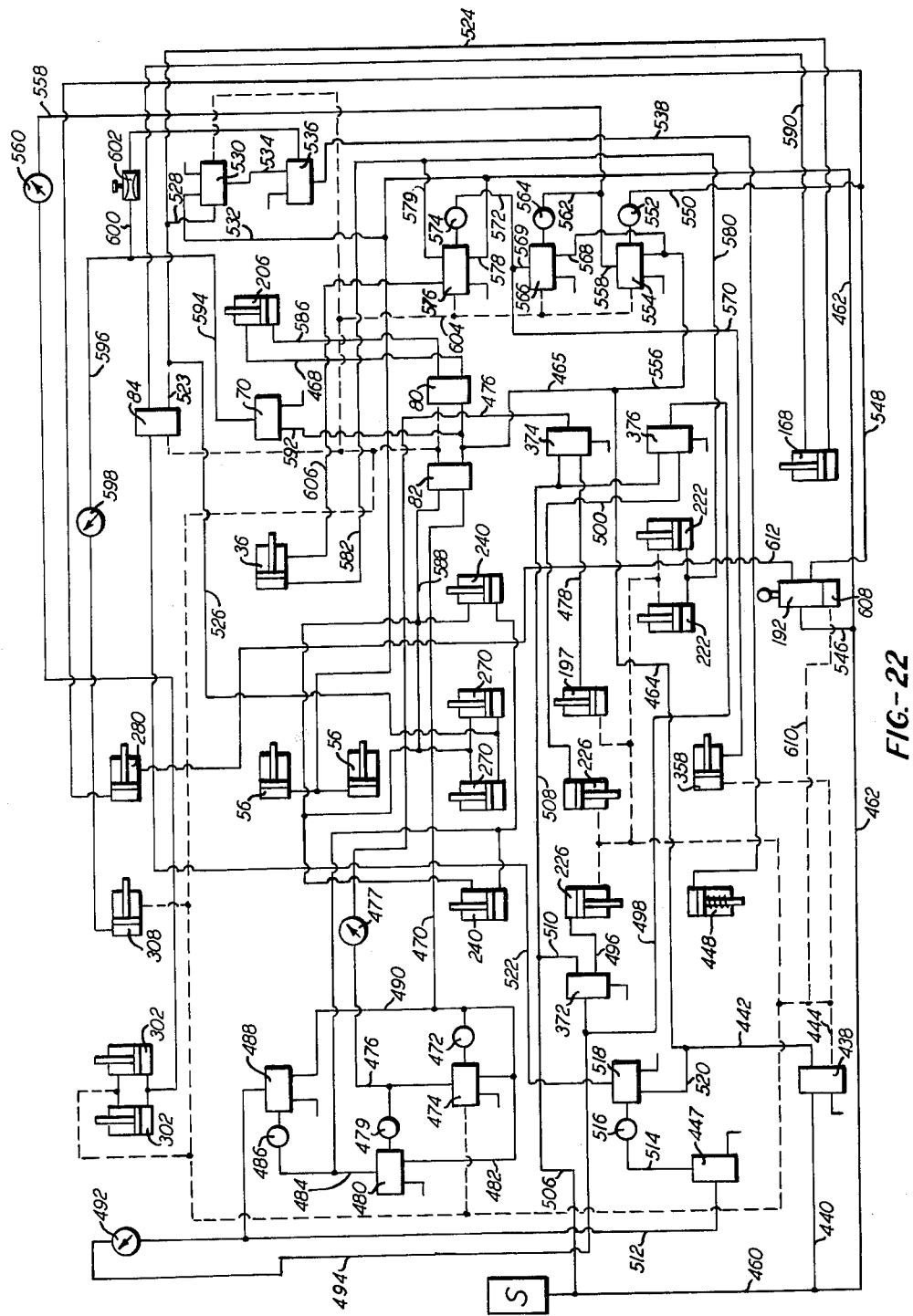

Referring to FIGURE 22, the pneumatic circuit includes a line 460 emanating from the source of pressure S, the line 440 branching off from the line 460. Air pressure passes from the line 460 through a line 462 to continuously provide pressure to the motors 56 and thereby resiliently urge the heads 50 to the forward ends of the slots 52.

The valves 372, 374 and 376 are normally in the FIGURE 19 position so that there is communication between the ports 404 and 408.

The valve spool of the valve 446 is normally in its lowered position so as to block the passage of air therethrough.

The last, upper and insole assembly is now presented bottom down to the machine with the insole 456 resting on the toe rest 188, the toe of the last bearing against the gage 204, the margin of the toe portion of the upper 458 inserted between the jaws of the pincers 196, and the forepart portions of the upper margin inserted between the jaws of the pincers 216. At this time the parts assume the position shown in FIGURES 23, 23A, 23B and 23C. The pincers 196 and 216 are at a level that is above the toe rest 188 and below the wipers 20 and yoke 124, and the pincers 196 are at a somewhat higher level than the pincers 216.

The operator now depresses the pedal 426 an amount sufficient to connect the lines 440 and 442 through the valve 438 and vent the line 444 to atmosphere through the valve 438, but not an amount sufficient to actuate the valve 446. This causes air to pass from the lines 460 and 440 through the valve 438, the line 442, a line 464, a line 465, the valve 80 and a line 468 to the motor 206 to close the front pincers 196 on the upper margin. Air can now travel from the line 465 through the valve 82, a line 470, and a sequence valve 472 to actuate a valve 474. The actuation of the valve 474 enables the air to pass from the line 470 through the valve 474, a line 476, a low pressure regulator 477, the ports 404 and 408 of the valve 374 and a line 478 to actuate the motor 197 to lower the toe pincers 196 and thereby stretch the upper about the toe of the last. Because of the yieldable nature of the air actuated motor 197, the pincers 196 is lowered until the resistance to movement of the upper exceeds the driving force of the motor.

Air now passes from the line 476 through a sequence valve 479 to actuate a valve 480. The actuation of the valve 480 enables air to pass from the line 470 through a line 482, the valve 480, and a line 484 to the motors 240 to cause the motors 240 to close the side pincers 216 on the forepart portions of the upper margin. Air can now pass from the valve 480 through a line 484 and a sequence valve 486 to actuate a valve 488 thereby enabling air to pass from the line 470 through a line 490, the valve 488, a low pressure regulator 492, a line 494, the ports 404 and 408 of the valve 372 and a line 496 to one of the motors 226. At the same time, air passes from the line 494 through a line 498, the ports 404 and 408 of the valve 376 and a line 500 to the other motor 226. The actuation of the motors 226 causes the side pincers 216 to be lowered to thereby stretch the forepart portions of the upper about the last. Due to the yieldable nature of the air actuated motors 226 when the resistance to stretching of the upper exceeds the driving force of the motors, the downward movement of the pincers 216 terminate. During the downward movement of the pincers 216, the pincers and the angles 220 swing to some extent about the pivots 221. At the conclusion of the downward movement of the pincers, they are positioned outwardly of and below the bottom of the insole 456 with the margin of the upper 458 gripped by the pincers substantially perpendicular to the plane of the last bottom. The swinging movement of the angles 220 can take place because the motors 222 are exhausted at this time.

Figure 24:
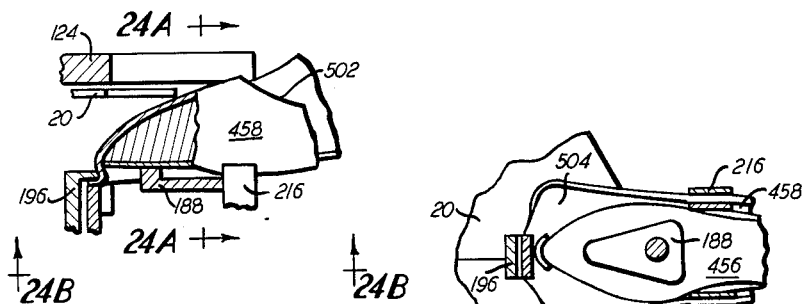
FIGURE 24 is a schematic representation of the shoe assembly in the machine after the front and side pincers have stretched the upper over the last.
Figure 24B:
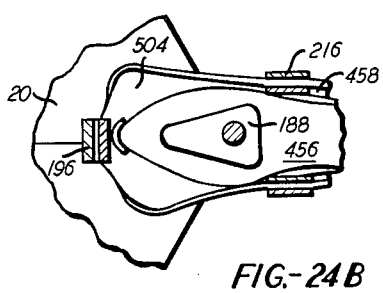
FIGURE 24B is a view taken on the line 24B—24B of FIGURE 24.
Figure 24A:
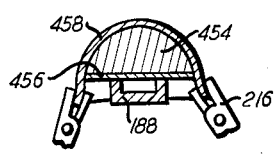
FIGURE 24A is a view taken on the line 24A—24A of FIGURE 24.

The machine parts maintain the posture they have arrived at at this time, as shown in FIGURES 24, 24A and 24B, as the lines to the other motors of the machine are blocked.

The above described sequence of movement of the pincers 196 and 216 causes the front pincers 196 to stretch the upper tightly over the toe of the last before the forepart portions of the upper are stretched over the last by the side pincers 216. It has been found that this sequence, by stretching the upper to its fullest extent in the direction of the toe of the last prior to the stretching action of the side pincers enables the forepart portions of the upper to have no components of motion in the direction of the toe when they are pulled downwardly by the side pincers and thus provides for a tight conformity of the upper to the last with the top line 502 (FIGURE 24) of the upper tightly stretched on the last. The portions of the upper margin between the pincers 196 and 216 are outspread into dog ears 504 (FIGURE 24B) that lie beneath the wipers 20.

The operator may at this time inspect the upper on the last, and if he finds that the top line 502 is not properly centered or located on the last for the subsequently performed wiping operation he may, through actuation of the valves 372, 374 and 376, increase or diminish the downwardly directed pressure of each of the pincers 196 and 216 to thereby relocate the position of the upper 458 on the last 454.

Figure 20:
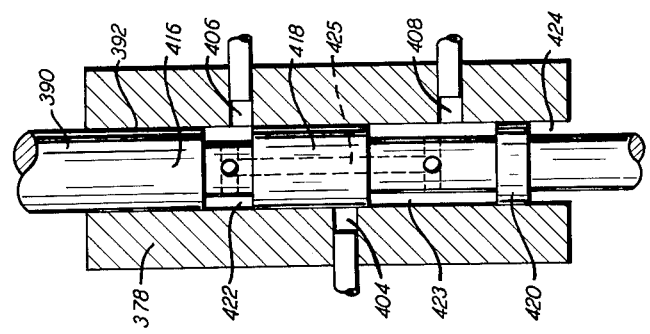

Referring to FIGURES 18 through 22, an actuation of the lever 388 for one of the valves 372, 374 or 376 to move the associated valve from the FIGURE 19 to the FIGURE 20 position provides communication between the ports 406 and 408 and blocks the port 404. When this is done with the valve 374, the low pressure air flowing through the line 476 is blocked at the valve, and air under high pressure flows from the line 460, through a line 506, a branch line 508, the ports 406 and 408 of the valve 374 and the line 478 to the motor 197 to force the front pincers 196 downwardly under high pressure. When this is done with the valve 376, the low pressure air flowing through the line 498 is blocked at the valve, and air under high pressure flows through the line 508, the ports 406 and 408 of the valve 376 and the line 500 to force the associated motor 226 and side pincers 216 downwardly under high pressure. When this is done with the valve 372, the low pressure air flowing through the line 494 is blocked at the valve, and air under high pressure flows through the line 506, a branch line 510, the ports 406 and 408 of the valve 372 and the line 496 to force the associated motor 226 and side pincers 216 downwardly under high pressure.

Figure 21:
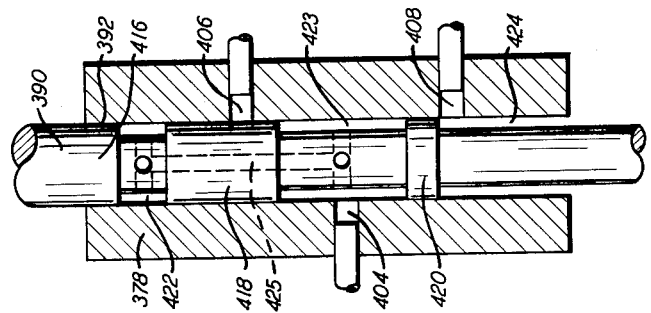

An actuation of the lever 388 for one of the valves 372, 374 or 376 to move the associated valve to the FIGURE 21 position provides communication between the port 408 and the annular chamber 424 and blocks the ports 404 and 406. When this is done, with the valve 374, the pressurized air in the motor 197 is vented to atmosphere through the line 478 and the port 408 and chamber 424 of the valve 374, so that the pressure forcing the toe pincers 196 downwardly is released. When this is done with the valve 376, the pressurized air in the associated motor 226 is vented to atmosphere through the line 500 and the valve 376, so that the pressure forcing the associated side pincers 216 downwardly is released. When this is done with the valve 372, the pressurized air in the associated motor 226 is vented to atmosphere through the line 496 and the valve 372 so that the pressure forcing the associated side pincers 216 downwardly is released.

It can thus be seen that by manipulating the several handles 388 the downwardly directed pressures of the pincers 196 and 216 may individually be increased and released to thereby reposition the upper about the last if this is necessary. After the upper has been repositioned to the operator's satisfaction, the valves 372, 374 and 376 are returned to the FIGURE 19 position, so that the pincers 196 and 216 are again forced downwardly under low pressure.

The operator now depresses the pedal 426 further, so as to actuate the valve 447. The actuation of the valve 447 allows air to travel from the valve 488, through a line 512, the valve 447, a line 514 and a sequence valve 516 to actuate a valve 518. Actuation of the valve 518 causes air to travel from the valve 438 through a line 520, the valve 518, a line 522, the valve 84, a line 523 and a line 524 to the motor 168 to actuate the motor 168 to raise the upper gripping head 174. At the same time, air passes from the line 523 through a line 526 to the motors 270 to cause the motors 270 to raise the retarder blades 268 at a faster rate than the rate of upward movement of the gripping head. At the same time, air from the line 524 passes through a line 528 to actuate a valve 530. Actuation of the valve 530 allows air to pass from the line 462 through a line 532, the valve 530, a line 534, a valve 536 and a line 538, to the motor 448 to actuate the motor 448 to force its piston rod 450 downwardly and thereby lock the pedal 426 in its downward position. The operator may now take his foot off the pedal without affecting the automatic operation of the machine through the rest of its cycle.

Prior to the operation of the machine, the yoke 124 had been adjusted for the particular style and size of shoe to be lasted in the manner described in the aforementioned application, Serial No. 193,829, filed May 10, 1962. The screw 180 had been adjusted so that it will bear against the flat 182 on the gripping head 174 and thus stop the upward movement of the gripping head by the motor 168 when the bottom of the insole 456 supported on the toe rest 188 has risen to a level above the upper surfaces of the wipers 20 by an amount that is substantially equal to the thickness of the lasting margin of the upper. This arrangement ensures a raising of the shoe to this desired level regardless of the heightwise dimension of the last and the thickness of the insole.

The raising of the retarder blades 268 during the upward movement of the gripping head 174 causes the retarder blades to engage the dog ears 504 and press them against the bottoms of the wipers 20 at about the time the bottom of the insole has reached the level of the bottoms of the wipers. During the subsequent movement of the gripping head 174 to the positions indicated in FIGURES 25 and 25B the engagement of the dog ears between the retarder blades and the wipers causes those portions of the upper between the front pincers 196 and the side pincers 216 to be stretched about the last. When these upper portions can no longer be stretched the dog ears 504 slip between the wiper bottoms and the retarder blades.

Figure 23:
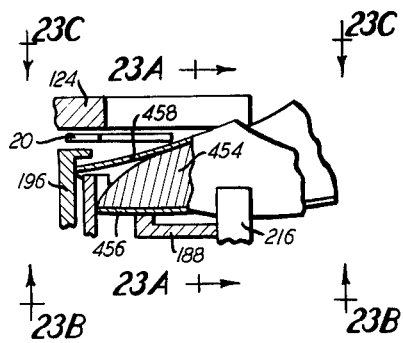
FIGURE 23 is a schematic representation of the shoe assembly in the machine at the beginning of the machine cycle.
Figure 23B:
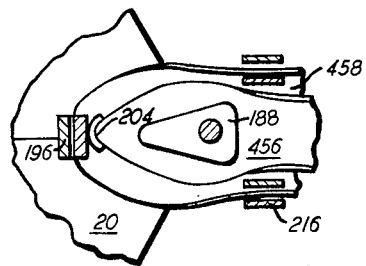
FIGURE 23B is a view taken on the line 23B—23B of FIGURE 23.
Figure 23A:
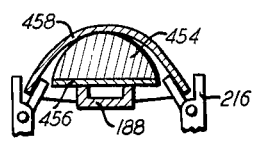
FIGURE 23A is a view taken on the line 23A—23A of FIGURE 23.
Figure 23C:
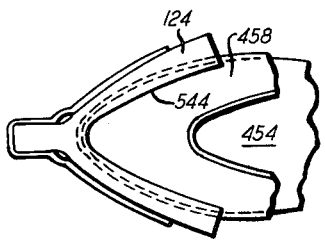
FIGURE 23C is a view taken on the line 23C—23C of FIGURE 23.

The shoe and last were initially so placed on the toe rest 188 that the edges of the last overlapped the wall 544 of the yoke 124, as indicated in FIGURE 23C. When the last is forced upwardly, the yoke wall 544 is initially compressed. When the wall can no longer be compressed, the bight 126 of the yoke flexes rearwardly against the pressure exerted by the spring 150, and the legs 128 flex outwardly against the pressure exerted by the springs 130. Should the shoe be substantially wider than the space between the legs 128, the support arms 116 and spring arms 118 will swing outwardly about the pivot pins 120 and compress the springs 122. During the latter movement, there will be relative swinging movement between the heads 110 and the clevises 112 about the pins 114 and relative swinging movement between the shafts 100 and the flanges 96 about the axes of the sleeves 98. The yieldable pressure exerted by the springs 122, 130 and 150 and the spring arms 118 and the aforementioned swinging movements will cause the yoke 124 to snugly engage the shoe upper 458 and cause the upper to snugly conform to the shape of the last during the upward movement of the last. The springs 140 urge the yoke legs 128 rearwardly during the raising of the shoe to always maintain the yoke bight 126 securely in the socket 94.

Towards the end of the upward movement of the gripping head 174, the valve stem 194 of the valve 192 engages the flat 195 to actuate the valve 192 so that pressurized air may pass from the line 460, through the line 462, a line 546, the valve 192 and a line 548 to the motor 280 to actuate the motor 280 to bring the slide 278 from its normal out-of-the-way position to a working position where the toe clamp 292 is above the forepart of the last. The forward movement of the slide 278 is terminated by the engagement of the lug 318 with the stud 320.

Air can now pass from the line 548 through a line 550 and a sequence valve 552 to actuate a valve 554. Actuation of the valve 554 allows air to pass from the line 464, a line 556, the valve 554 a line 558 and a pressure regulator 560 to actuate the motors 302 under relatively low pressure. The actuation of the motors 302 serves to swing the lever 286 about the pivot 288 an amount sufficient to cause the roller 300 to depress the toe clamp holder 290 and bring the toe pad 292 into engagement with the forepart of the upper and clamp the shoe and last between the toe pad 292 and the toe rest 188.

Air can now pass from the line 558, through a line 562 and a sequence valve 564 to actuate a valve 566. Actuation of the valve 566 enables air to pass from the line 556 through a line 568, the valve 566, a line 569 and a line 570 to the motor 358 to actuate the motor 358 to bring the heel clamp 336 to bear against the heel portion of the last.

Figure 25:
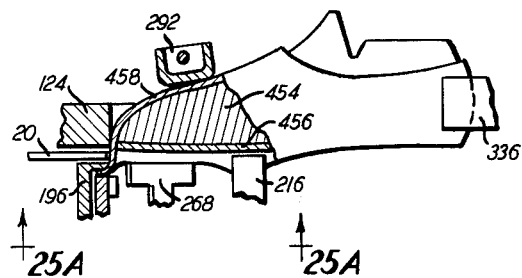
FIGURE 25 is a schematic representation of the shoe assembly in the machine just prior to the forward movement of the wipers taken on the line 25—25 of FIGURE 25A.
Figure 25B:
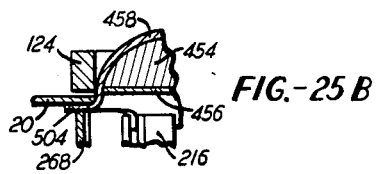
FIGURE 25B is a view taken on the line 25B—25B of FIGURE 25A.
Figure 25A:
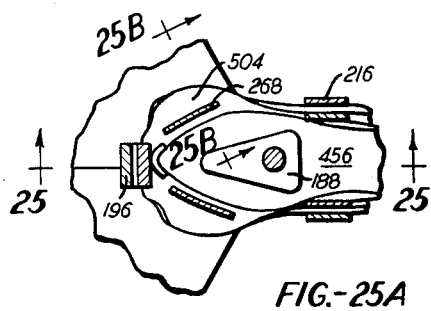
FIGURE 25A is a view taken on the line 25A—25A of FIGURE 25.

The parts now assume the position shown in FIGURES 25, 25A and 25B.

Figure 26A:
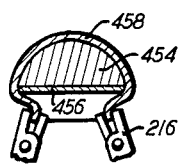
FIGURE 26A is a view taken on the line 26A—26A of FIGURE 26.
Figure 26:
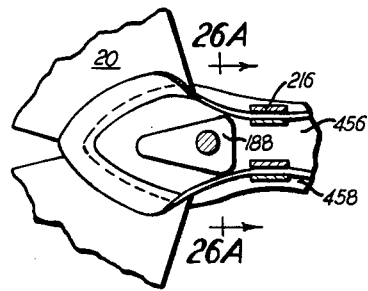
FIGURE 26 is a schematic representation of the shoe assembly in the machine during the forward movement of the wipers.

Air can now pass from the valve 566 through the line 569, a line 572 and a sequence valve 574 to actuate a valve 576. Actuation of the valve 576 enables air to pass from the line 462 through a line 578, the valve 576, a line 579 and a line 580 to the motors 222 to actuate the motors 222 to swing the side pincers 216 toward each other beneath the insole. At the same time, air passes from the valve 576, through the line 579 and a line 582 to the motor 36 to actuate the motor 36 to drive the wipers 20 in their working stroke. The location of the pincers 216 beneath the insole 456, as indicated in FIGURES 26 and 26A, lays the margin of the upper 458 at the forepart portions in against the insole, so that the portions of the upper margin engaged by the wipers is of substantially uniform width and the upper margin does not fade away from the wipers as the wiper move in, but is laid against the toe portion of the insole with a substantially uniform width. The actuation of the motor 36 causes forward movement of the block 28 at a predetermined speed. Movement of the block, through the linkage comprising members 38, 40, 42, 44, 46 and 48 causes the plate 16 and the wipers 20 carried by the plate to be translated forwardly at a slower speed than the block. Concomitantly with the forward movement of the plate 16 and the wipers 20, the wipers are caused to swing toward each other about the center of curvature of the slots 22 by the links 26 thereby causing the divergent, front wiper surfaces 582 (FIGURE 4) to move across the edge of the last and commence to wipe or fold the lasting margin of the upper against the insole. The center of curvature of the slots 22 coincide with the point of intersection 584 (FIGURE 4) of the surfaces 582, hereafter referred to as the vertex of the wipers. These movements continue until the button 60 engages the stud 64 to stop the forward movement of the plate 16. When the plate 16 terminates its forward movement, continued forward movement of the block 28 causes the wipers 20 to swing about the vertex 584 without any forward movement of the vertex 584. During this portion of the wiper stroke, the links 46 are caused to swing rearwardly about the pivots 42 (FIGURE 4) and the heads 50 move rearwardly in the slots 52 against the resilient force of the motors 56. By this arrangement, the wipers are caused to move forwardly only an amount sufficient to enable the vertex 584 to cross over the toe of the last and wipe the margin of the upper at the toe. By precluding further forward movement of the vertex of the wipers, the wipers do not exert an undesirable stress in a direction extending heelwardly of the last as they continue to close in across the insole.

Figure 7:
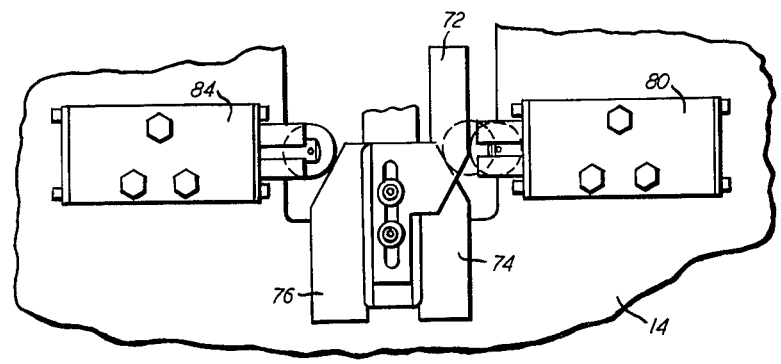
Figure 8:
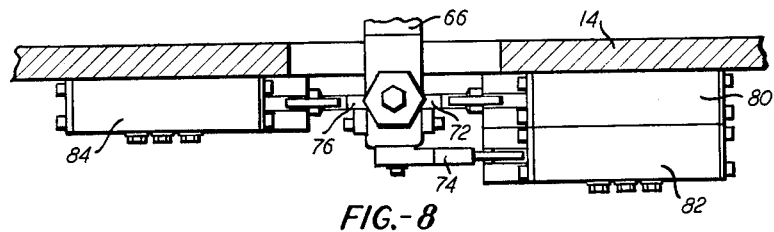

During the forward movement of the block 28, the valves 80, 82 and 84 are respectively actuated by the valve actuators 72, 74 and 76 (see FIGURES 7 and 8).

Actuation of the valve 80 shuts off the air going into the motor 206 from the valve 80 through the line 468 and admits air into the motor 206 from the valve 80 through a line 586 thereby causing the front pincers 196 to open and release the toe portion of the lasting margin of the upper.

Actuation of the valve 82 shuts off the air going into the motors 240 from the valve 82 through the line 484 and admits air into the motors 240 from the valve 82 through a line 588 thereby causing the pincers 216 to open and release the forepart portions of the lasting margin of the upper. Actuation of the valve 82 also shuts off the pressurized air entering the motor 197 through the line 478, so that the front pincers 196 are no longer forced downwardly. Actuation of the valve 82 also shuts off the pressurized air entering the motors 226 through the lines 496 and 500, so that the side pincers 216 are no longer forced downwardly.

Actuation of the valve 84 cuts off the air entering the motor 168 through the line 524 and admits air into the motor 168 from the valve 84 through a line 590 to thereby lower the gripping head 174.

Actuation of the valve 84 also cuts off the air entering the motors 270 through the line 526. The actuation of the valve 82 admitted air into the motors 270 through the line 588 in a direction to lower the motor. The actuations of the valves 82 and 84 thus cause the motors 270 to lower the retarder blades 268 away from the dog ears 504.

The actuation of the valves 80, 82 and 84 is so timed that the front pincers 196 and retarder blades 268 disengage the upper margin just as the margin is engaged by the wipers 20, the side pincers 216 are opened just after the wipers across the side edges of the last, and the gripping head 174 is lowered after the wipers have crossed the bottom of the last. This arrangement enables the wipers to stress the upper margin just as it is released by the front pincers and the retarders, enables the side pincers which are at this time beneath the insole, to continue to lay the upper margin against the insole until the wipers have started to wipe the margin against the insole, and enables the toe rest 188 to descend with the head 174 after the wipers are beneath the insole, so that the toe clamp 292 will force the lasting margin and upper directly against the wipers.

The valve stem 194 is so constructed that it does not shift in the valve 194 during the lowering of the uppper gripping head 174.

At the end of the wiper stroke, the valve 70 is actuated by the stud 68. Actuation of the valve 70 enables air to pass from the line 465, through a line 592, the valve 70, a line 594, a line 596 and a high pressure regulator 598 in the line 596 to supply air to the motor 308 at a higher pressure than the air supplied to the motors 302. The actuation of the motor 308 interposes the cam 312 between the rollers 314 and 316 to apply a heavier pressure to the lever 286 than was previously applied by the motors 302 and thus to apply a relatively heavy bedding pressure between the now wiped in lasting margin of the upper and the wipers 20.

Actuation of the valve 70 also supplies air from the line 594, through a line 600, and an adjustable metering valve 602 in the line 600 to the valve 536 to actuate the valve 536 to cut off the pressurized air entering the motor 448 through the lines 538 from the valve 536. This causes the spring in the motor 448 to return the piston rod 450 of motor to its initial position and thereby enable the counterweight 430 to return the pedal 426 to its original position. The return of the pedal 426 to its original position enables the valve 447 to return to a position where it blocks the lines 512 and 514 and also enables the valve 438 to return to a position where the lines 440 and 444 are in communication and the line 442 is vented to atmosphere. This has the result of bringing the machine parts to original position and releasing the shoe in the manner described below. The metering valve 602 acts to restrict the flow of air through the line 600 to thereby delay the actuation of the valve 536 for a time interval that is dependent on the adjustment of the valve 602 and thus enables the bedding pressure to be applied for a predetermined length of time prior to returning the machine parts to their original position.

Prior to placing the shoe in the machine, cement had been deposited on the toe portion of the insole by an apparatus such as that disclosed in Patent No. 3,079,618 or Patent No. 3,157,896. As a result of the pressures generated during the wiping operation and the application of the bedding pressure described above, the wiped-in upper margin and the insole are adhesively bonded to each other through the cement.

The actuation of the valve 438 to cause air to flow through the valve from the line 440 into the line 444 enables air to pass from the valve 438 through vent lines to the motors 222 to swing the pincers 216 back to their normal outer position, to the motors 308 and 302 to raise the toe clamp 292 away from the last, to the motors 226 and 197 to raise the pincers 196 and 216 with respect to the gripping head 174, to the motor 358 to return the heel clamp to its inoperative position, and to the valve 576 through a line 604 to return the valve 576 to its original position and thus enable air to pass through the line 578, the valve 576, a line 606 to the motor 36 to cause the motor 36 to return the wipers 20 to their initial positions. With the retraction of the wipers 20, the valves 70, 80, 82, 84 are returned to their initial positions.

The actuation of the valve 438 also causes air to pass from the valve 438 through a line 610 to actuate a pilot valve 608 to return the valve stem 194 of the valve 192 to its original position to enable air to pass from the line 546 through the valve 192 and a line 612 to the motor 280 to retract the motor 280 and thus return the slide 278 to its original position.

To summarize, during the working cycle of the machine, the operator places the last, upper and insole assembly in the machine bottom down with the insole 456 resting on the toe rest 188 and the lasting margin of the top portion of the upper 458 inserted between the open jaws of the pincers 196 and 216, so that the parts assume the position shown in FIGURES 23, 23A 23B and 23C. The operator now depresses the pedal 426 an amount sufficient to actuate the valve 438 to thereby first close the front pincers 196 on the toe portion of the upper margin, then lower the pincers 196 to stretch the upper about the toe of the last, then close the side pincers 216 on the forepart portions of the upper margin, and then lower the side pincers to stretch the forepart portions of the upper about the last.

The machine now stops with the parts in the position shown in FIGURES 24, 24A and 24B. If the operator is not satisfied with the way the upper is stretched about the last, he may selectively and individually lower or increase the downwardly directed force of each of the pincers 196 and 216 by manipulating the handles 388 to reposition the upper on the last.

The operator now depresses the pedal 426 further to actuate the valve 446 to thereby concomitantly raise the upper gripping head 174 and the pincers 196 and 216 carried thereby to a level that places the insole 456 above the tops of the wipers 20 by an amount that is substantially equal to the thickness of the lasting margin of the upper 458. During the upward movement of the head 174, the retarder blades 268 are raised with respect to the head 174 to cause the retarder blades 268 to press the dog ears 504 against the bottom of the wipers 20 and thereby stretch the portions of the upper margin between the pincers 216 and 196 about the last during the final increment of upward movement of the head 174. During the upward movement of the head 174, the yoke 124 engages the upper 458 to cause the upper to snugly conform to the shape of the last, so that the pincers, retarders and yoke constrain the upper to the shape of the last.

The slide 278 is now moved forwardly to bring the toe clamp 292 above the forepart of the last. This is followed by the bringing of the toe pad against the forepart of the upper under relatively light pressure to clamp the shoe and last between the toe pad 292 and the toe rest 188. The heel clamp 336 is now brought to bear against the heel portion of the last. The parts now assume the position shown in FIGURES 25, 25A and 25B.

The side pincers 216 are now swung inwardly toward each other beneath the last and at the same time the wipers 20 are driven forwardly in their working stroke. The inward movement of the side pincers lays the margin of the upper 458 at the forepart portions in against the insole, so that the portions of the upper margin engaged by the wipers is of substantially uniform width and the upper margin does not fade away from the wipers as the wipers move in (see FIGURES 26 and 26A).

During the working stroke of the wipers, the front pincers 196 are opened to release the toe end portion of the lasting margin of the upper, the downward force of the pincers 196 is terminated, the side pincers 216 are opened to release the forepart portions of the lasting margin of the upper and the downward force of the pincers 216 is terminated, the retarder blades 268 are lowered away from the dog ears 504 and the gripping head 174 is lowered. These steps take place in such a manner that the front pincers 196 and the retarder blades 268 disengage the upper margin just as the upper margin is engaged by the wipers 20, the side pincers 216 are opened just after the wipers cross the side edges of the last and the gripping head 174 is lowered after the wipers have crossed the bottom of the last. This arrangement enables the wipers to stress the upper margin just as it is released by the front pincers and the retarders, enables the side pincers which are at this time beneath the insole to continue to lay the upper margin against the insole until the wipers have started to wipe the margin against the insole, and enables the toe rest 188 to descend with the head 174 after the wipers are beneath the insole, so that the toe clamp 292 will force the lasting margin and upper directly against the wipers.

At the end of the wiper stroke, a relatively heavy pressure is applied by the toe clamp 292 against the shoe to thereby provide a relatively heavy bedding pressure between the now wiped-in lasting margin of the upper and the wipers 20. After the bedding pressure has been applied for a predetermined time interval, the pedal 426 is returned to its original position to thereby return the valves 438 and 446 to their original position and cause the machine parts to return to their original condition.

It should be understood that the present disclosure is for the purpose of illustration only and that this invention includes all modifications and equivalents which fall within the scope of the appended claims. It is to be understood that terms such as "forward," "downward" and "top" merely define the relative movements and location of the parts and should be so construed.

We claim:

1. A method of pulling over and lasting the toe of a shoe comprising the steps of: providing wiping means; supporting bottom-down a shoe assembly that includes a last having an upper draped about its toe and an insole on its bottom with the bottom of the insole located below the top of the wiping means; gripping the margin of the upper at its toe end portion and spacedly therefrom at each of its forepart portions and pulling downwardly at the gripped portions to stretch the said portions of the upper about the last and create dog ears between the gripped portions that extend outwardly of the last; raising the shoe assembly at least an amount sufficient to bring the bottom of the insole to the level of the top of the wiping means; applying upwardly directed forces to press the dog ears between said gripped portions against the bottom of the wiping means during the rise of the shoe assembly; and moving the wiping means across the bottom of the last to wipe the lasting margin against the insole.

2. A method of pulling over and lasting the toe of a shoe comprising the steps of: providing wiping means; supporting bottom-down a shoe assembly that includes a last having an upper draped about its toe and an insole on its bottom with the bottom of the insole located below the top of the wiping means; gripping the margin of the upper at its toe end portion and spacedly therefrom at each of its forepart portions and pulling downwardly at the gripped portions to stretch the said portions of the upper about the last and create dog ears between the gripped portions that extend outwardly of the last; raising the shoe assembly at least an amount sufficient to bring the bottom of the insole to the level of the top of the wiping means while maintaining the said toe end and forepart portions of the upper gripped and pulled; applying upwardly directed forces to press the dog ears between said gripped portions against the bottom of the wiping means during the rise of the shoe assembly; moving the wiping means in a working stroke across the bottom of the last to wipe the lasting margin against the insole; and releasing the gripped toe end and forepart portions of the upper margin and the pressed dog ears during the working stroke of the wiping means.

3. A method of pulling over and lasting the toe of a shoe comprising the steps of: providing wiping means; supporting bottom-down a shoe assembly that includes a last having an upper draped about its toe end and an insole on its bottom with the bottom of the insole located below the top of the wiping means; gripping the margin of the upper at its toe end portion and spacedly therefrom at each of its forepart portions and pulling downwardly at the gripped portions to stretch the said portions of the upper about the last and create dog ears between the gripped portions that extend outwardly of the last; raising the shoe assembly at least an amount sufficient to bring the bottom of the insole to the level of the top of the wiping means while maintaining the said toe end and forepart portions gripped and pulled; applying upwardly directed forces to press the dog ears between said gripped portions against the bottom of the wiping means during the rise of the shoe assembly; moving the gripped forepart portions of the upper margin toward each other beneath the bottom of the last to lay the upper margin against the insole; moving the wiping means in a working stroke across the bottom of the last to wipe the lasting margin against the insole; and releasing the gripped toe end and forepart portions of the upper margin and the pressed dog ears during the working stroke of the wiping means.

4. A toe pulling over and lasting machine comprising: wiping means mounted for forward movement; a shoe support positioned adjacent the wiping means for supporting bottom-down a shoe assembly that includes a last having an upper draped about its toe and an insole positioned on its bottom; means mounting the shoe support for heightwise movement; means for initially placing the shoe support in a position wherein the bottom of the insole is below the top of the wiping means; a front gripping means located below the wiping means and rearwardly of the shoe support for gripping the toe end portion of the upper margin; a side gripping means located at each side of the shoe support for gripping the forepart portions of the upper margin, each of said side gripping means being below the wiping means and forwardly of the front gripping means; means mounting all of said gripping means for heightwise movement with respect to the shoe support; means for causing each of said gripping means to grip the aforesaid portions of the upper margin and for lowering all of said gripping means to stretch the said portions of the upper about the last and create dog ears between the gripped portions that extend outwardly of the last; a retarder means mounted under the wiping means and between the front gripping means and each of the side gripping means; means mounting each of the retarder means for heightwise movement; means causing each of the retarder means to be normally spaced from the wiper means; means for raising the shoe support and the front and side gripping means in unison at least an amount sufficient to bring the bottom of the insole to the level of the top of the wiping means; means for applying an upwardly directed force to each of the retarder means during the rise of the shoe support and gripping means to cause the retarder means to press the dog ears against the bottom of the wiper means; and means for moving the wiping means forwardly across the bottom of the last to wipe the upper margin against the insole.

5. A toe pulling over and lasting machine comprising: wiping means mounted for forward movement; a shoe support positioned adjacent the wiping means for supporting bottom-down a shoe assembly that includes a last having an upper draped about its toe and an insole positioned on its bottom; means mounting the shoe support for heightwise movement; means for initially placing the shoe support in a position wherein the bottom of the insole is below the top of the wiping means; a front gripping means located below the wiping means and rearwardly of the shoe support for gripping the toe end portion of the upper margin; a side gripping means located at each side of the shoe support for gripping the forepart portions of the upper margin, each of said side gripping means being below the wiping means and forwardly of the front gripping means; means mounting all of said gripping means for heightwise movement with respect to the shoe support; means for causing each of said gripping means to grip the aforesaid portions of the upper margin and for lowering all of said gripping means to stretch the said portions of the upper about the last and create dog ears between the gripped portions that extend outwardly of the last; a retarder means mounted under the wiping means and between the front gripping means and each of the side gripping means; means mounting each of the retarder means for heightwise movement; means causing each of the retarder means to be normally spaced from the wiper means; means for raising the shoe support and the front and side gripping means in unison at least an amount sufficient to bring the bottom of the insole to the level of the top of the wiping means; means for applying an upwardly directed force to each of the retarder means during the rise of the shoe support and gripping means to cause the retarder means to press the dog ears against the bottom of the wiper means; means for moving the wiping means forwardly across the bottom of the last to wipe the upper margin against the insole; and means operative during the forward movement of the wiping means to cause each of said gripping means to release the upper margin and to release the upwardly directed forces of the retarder means against the dog ears.

6. A toe pulling over and lasting machine comprising: wiping means mounted for forward movement; a shoe support positioned adjacent the wiping means for supporting bottom-down a shoe assembly that includes a last having an upper draped about its toe and an insole positioned on its bottom; means mounting the shoe support for heightwise movement; means for initially placing the shoe support in a position wherein the bottom of the insole is below the level of the top of the wiping means; a front gripping means located below the wiping means and rearwardly of the shoe support for gripping the toe end portion of the upper margin; a side gripping means located at each side of the shoe support for gripping the forepart portions of the upper margin, each of said side gripping means being below the wiping means and forwardly of the front gripping means; means mounting all of said gripping means for heightwise movement with respect to the shoe support; means mounting the side gripping means for movement toward each other; means for causing each of said gripping means to grip the aforesaid portions of the upper margin and for lowering all of said gripping means to stretch the said portions of the upper about the last and create dog ears between the gripped portions that extend outwardly of the last; a retarder means mounted under the wiping means and between the front gripping means and each of the side gripping means; means mounting each of the retarder means for heightwise movement; means causing each of the retarder means to be normally spaced from the wiper means; means for raising the shoe support and the front and side gripping means in unison at least an amount sufficient to bring the bottom of the insole to the level of the top of the wiping means; means for applying an upwardly directed force to each of the retarder means during the rise of the shoe support and gripping means to cause the retarder means to press the dog ears against the bottom of the wiper means; means for moving the side gripping means toward each other beneath the bottom of the last to lay the upper margin against the insole; means for moving the wiping means forwardly across the bottom of the last to wipe the upper margin against the insole; and means operative during the forward movement of the wiping means to cause each of said gripping means to release the upper margin and to release the upwardly directed forces of the retarder means against the dog ears.

7. A pulling over mechanism comprising: a shoe support for supporting bottom-down a last having an upper draped thereon; a plurality of gripping means located adjacent the support; means for causing each of the gripping means to grip a selected portion of the margin of the upper; means mounting each of the gripping means for heightwise movement; a fluid actuated motor connected to each of the gripping means to effect such heightwise movement; a source of fluid pressure; control means interconnecting said source of pressure and each of the fluid actuated motors operative to cause the motors to apply a predetermined pressure to each of the gripping means to move the gripping means downwardly under said predetermined pressure after the gripping means have gripped said selected upper margin portions to thereby stretch the upper tightly about the last; and a separate manually manipulable control in said control means interposed between each of said fluid actuated motors and said source of pressure that is operative to selectively increase or decrease the downwardly directed pressure applied by its associated motor to its associated gripping means.

8. A pulley over mechanism according to claim 7 wherein said plurality of gripping means comprise: a front pincers located rearwardly of the shoe support for gripping the toe end portion of the upper margin; and a side pincers located on each side of the shoe support and forwardly of the front pincers for gripping the forepart portions of the upper margin.

9. The pulling over mechanism according to claim 7 wherein each of said controls comprises: a handle; means normally maintaining the handle in a first position but permitting movement of the handle away from the first position to a second position and a third position; means effective to apply said predetermined pressure when the handle is in said first position; means operative to increase the pressure upon movement of the handle to the second position; and means operative to decrease the pressure upon movement of the handle to the third position.

10. A pulling over mechanism comprising: a shoe support for supporting bottom-down a last having an upper draped thereon; a plurality of pincers located adjacent the support, each of the pincers having a pair of relatively movable pincer jaws; means for closing the jaws of each of the pincers to thereby cause each pincers to grip a selected portion of the margin of the upper; means mounting each of the pincers for heightwise movement with respect to the shoe support; a fluid actuated motor connected to each of said pincers to effect said heightwise movement; a source of pressure; control means interposed between said source of pressure and each of said motors operative to supply fluid under a predetermined pressure to each of said motors to cause downward movement of each of the pincers after they have gripped said selected upper margin portions to thereby stretch the upper tightly about the last; and a separate manually manipulable control in said control means interposed between each of said motors and said source of pressure that is operative to selectively increase or decrease the downwardly directed pressure of its associated motor.

11. The pulling over mechanism according to claim 10 wherein each of said controls comprises: a handle; means normally maintaining the handle in a first position but permitting movement of the handle away from the first position to a second position and a third position; means effective to apply said predetermined pressure when the handle is in said first position; means operative to increase the pressure upon movement of the handle to the second position; and means operative to decrease the pressure upon movement of the handle to the third position.

12. A pulling over mechanism comprising: a shoe support for supporting bottom-down a last having an upper draped thereon; a plurality of pincers located adjacent the support, each of the pincers having a pair of relatively movable pincer jaws; means for closing the jaws of each of the pincers to thereby cause each pincers to grip a selected portion of the margin of the upper; means mounting each of the pincers for heightwise movement with respect to the shoe support; a fluid actuated motor connected to each of said pincers for effecting downward movement of the pincers to thereby stretch the upper tightly about the last; a source of fluid under pressure; a movably mounted valve having a first, a second and a third position associated with each motor; a first line extending from the source to each valve for conveying fluid at a relatively low pressure; a second line extending from the source to each valve for conveying fluid at a relatively high pressure; a third line extending from each valve to its associated motor; flow control means in each valve for connecting the first and third lines when the valve is in the first position to thereby force the associated motor downwardly under relatively low pressure; flow control means in each valve for connecting the second and third lines when the valve is in the second position to thereby force the associated motor downwardly under relatively high pressure; flow control means in each valve for blocking the first and second lines at the valve and for venting the third line through the valve when the valve is in the third position thereby cutting off fluid under pressure to the associated motor; and manually manipulable means connected to each valve for shifting it from one to another of said positions.

13. The pulling over mechanism according to claim 12 wherein each of said valves comprises a valve spool slidably mounted in a valve housing; said valves are in said first positions when the spools are centered in their housings; said valves are in said second positions when they are moved off center in a first direction; and said valves are in said third positions when they are moved off center in a second direction; and further comprising: spring means associated with each valve spool for normally maintaining the associated valve in its first position; and a handle operatively connected to each valve spool for shifting it to the second or third position.

14. A pulling over and lasting machine comprising: wiping means mounted for forward movement; a head located adjacent the wiping means; a shoe support on the head for supporting bottom-down a shoe assembly that includes a last having an upper thereon and an insole positioned on its bottom; means mounting the head and shoe support for heightwise movement; means for initially placing the head and shoe support in a position wherein the bottom of the insole is below the top of the wiping means; a motor having a drive member that is yieldably movable in response to the application of pressure; means connecting the drive member to the head for raising the head in response to said application of pressure; a stop member positioned in alignment with the head; means for supplying pressure to the motor to cause the drive member to raise the head until the head engages the stop member while continuing to maintain the pressure to the motor after the termination of the rise of the head, whereby the head is raised an amount sufficient to bring the bottom of the insole a predetermined distance above the top of the wiping means regardless of the thickness of the insole or the height of the last; and means for constraining the upper to the shape of the last during the rise of the shoe assembly.

15. A pulling over and lasting machine comprising: a frame; wiping means mounted in the frame for forward movement; a motor secured to the frame adjacent the wiping means having an upwardly extending drive rod; an upwardly extending guide bar secured to the frame located alongside the drive rod; a head secured to the drive rod; gib means on the head slidably receiving the guide bar; a shoe support on the head for supporting bottom-down a shoe assembly that includes a last having an upper thereon and an insole positioned on its bottom; means for initially placing the head and shoe support in a position wherein the bottom of the insole is below the top of the wiping means; a stop member on the guide bar that is in alignment with the head; means for actuating the motor to raise the head until the head engages the stop member whereby the head and shoe support are raised an amount sufficient to bring the bottom of the insole a predetermined distance above the top of the wiping means regardless of the thickness of the insole or the height of the last; and means for constraining the upper to the shape of the last during the rise of the shoe assembly.

16. A pulling over and lasting machine comprising: wiping means mounted for forward movement; a bracket located adjacent the wiping means; a fluid actuated motor secured to the bracket having a piston rod extending upwardly of the bracket; a guide bar secured to and extending upwardly of the bracket alongside the piston rod; a head secured to the piston rod; gib means on the head slidably receiving the guide bar; a shoe support on the head for supporting bottom-down a shoe assembly that includes a last having an upper thereon and an insole positioned on its bottom; means for initially placing the head and shoe support in a position wherein the bottom of the insole is below the top of the wiping means; an upwardly facing flat on the head; a stop member on the guide bar positioned above and in alignment with the flat; means for actuating the motor to raise the head until the flat engages the stop member whereby the head and shoe support are raised an amount sufficient to bring the bottom of the insole a predetermined distance above the top of the wiping means regardless of the thickness of the insole or the height of the last; and means for constraining the upper to the shape of the last during the rise of the shoe assembly.

17. A pulling over and lasting machine comprising: wiping means mounted for forward movement; a gripping head located adjacent the wiping means; means mounting the gripping head for heightwise movement; powered means connected to the head for effecting its heightwise movement; a rest on the head for supporting bottom-down a last having an upper mounted thereon and an insole located on its bottom; at least one pincers mounted on said head having a pair of relatively movable jaws adapted to grip the margin of the upper; a first motor mounted on said head and operatively connected to said pincers to effect heightwise movement of the pincers with respect to the head; and a second motor mounted on said pincers operative to effect opening and closing of the pincers jaws.

18. The machine according to claim 17 further comprising: a retarder, mounted on the head, beneath the wiping means having a retarder blade adapted to press the upper margin against the wiping means; and a third motor on said head operatively connected to the retarder to effect heightwise movement of the retarder with respect to the head.

19. A pulling over and lasting machine comprising: wiping means mounted for forward movement; a gripping head located adjacent the wiping means; a head driving motor operatively connected to the gripping head for effecting heightwise movement thereof; a rest on the head for supporting bottom-down a last having an upper mounted thereon and an insole located on its bottom; a front pincers mounted on the head rearwardly of the shoe support; a side pincers mounted on the head rearwardly of the front pincers and on each side of the head; a pair of relatively movable jaws on each of said pincers; a trio of pincers actuating motors mounted on said head, each of which is operatively connected to one of said pincers to effect heightwise movement of the pincers with respect to the head; a pincers jaw motor mounted on each of said pincers operative to effect opening and closing of the pincers jaws of the associated pincers; a retarder mounted on the head between the front pincers and each of said side pincers, each of said retarders having a retarder blade located beneath the wiping means; and a pair of retarder driving motors mounted on said head, each of which is operatively connected to one of said retarders to effect heightwise movement of the retarders with respect to the gripping head.

20. The machine according to claim 19 further comprising: means mounting said side pincers on the head for movement toward and away from each other; and a pair of pincers tilting motors mounted on the head, each of which is operatively connected to one of said side pincers to effect the last mentioned movement.

21. A pincers assembly comprising: a head; an angle having a prone leg and an upright leg swingably mounted on the head; a pincers, having a pair of relatively movable jaws, slidably mounted on the upright leg for heightwise movement with respect to said upright leg; a first motor mounted on the head and operatively connected to the angle to effect said swinging movement; a second motor mounted on the angle and operatively connected to the pincers to effect said heightwise movement; and a third motor mounted on the pincers and operatively connected to the pincers jaws to effect opening and closing thereof.

References Cited by the Examiner

UNITED STATES PATENTS

| | | | |
|---|---|---|---|
| 663,777 | 12/1900 | McFeely | 12—10.2 |
| 765,273 | 7/1904 | Cutlan | 12—10.5 |
| 2,225,639 | 12/1940 | Keall et al. | 12—10.4 |
| 2,235,887 | 3/1941 | Kamborian | 12—145 |
| 2,391,461 | 12/1945 | Jorgensen | 12—10.5 |
| 2,758,324 | 8/1956 | Stratton et al. | 12—10.4 |
| 2,768,396 | 10/1956 | Jorgensen | 12—10.5 |
| 3,009,182 | 11/1961 | Kamborian | 12—145 |
| 3,011,186 | 12/1961 | Dunlap et al. | 12—14.5 X |
| 3,025,541 | 3/1962 | Weinschenk | 12—10.1 |
| 3,097,379 | 7/1963 | Hawkins | 12—10.1 |

FOREIGN PATENTS 40,318  5/1907  Switzerland.

JORDAN FRANKLIN, *Primary Examiner.*

EDWARD V. BENHAM, *Examiner.*